United States Patent [19]

Pomara, Jr.

[11] Patent Number: 5,782,170
[45] Date of Patent: Jul. 21, 1998

[54] METHOD AND APPARATUS FOR AUTOMATICALLY FRYING FOOD PRODUCTS

[75] Inventor: Johnny B. Pomara, Jr., 2223 Crockett Dr., Carrollton, Tex. 75006

[73] Assignees: Johnny B. Pomara, Jr., Carrollton; Industrial Catering, Inc., Grand Prairie, both of Tex.

[21] Appl. No.: 707,745

[22] Filed: Sep. 4, 1996

[51] Int. Cl.$^6$ .................................................. A47J 27/18
[52] U.S. Cl. .......................... 99/407; 99/416; 426/438
[58] Field of Search ............................. 99/404, 407, 409, 99/416; 426/438, 439, 523

[56] References Cited

U.S. PATENT DOCUMENTS

| | | |
|---|---|---|
| 1,610,564 | 12/1926 | McLaughlin . |
| 3,036,513 | 5/1962 | Reeves .................................. 99/404 |
| 3,690,247 | 9/1972 | Van Cleven et al. ................. 99/355 |
| 4,205,600 | 6/1980 | Garrett ................................. 99/341 |
| 4,450,757 | 5/1984 | Alfio ................................ 99/407 X |
| 4,488,478 | 12/1984 | Leeper ............................... 99/330 |
| 4,597,325 | 7/1986 | Cardullo et al. ..................... 99/404 |
| 4,685,386 | 8/1987 | Bezon ................................. 99/404 |
| 4,719,850 | 1/1988 | Sewell ................................. 99/404 |
| 4,979,864 | 12/1990 | Cahlander et al. ............... 99/407 X |
| 5,189,944 | 3/1993 | Rasmussen et al. ................ 99/334 |
| 5,275,092 | 1/1994 | Fauteux .............................. 99/407 |
| 5,347,917 | 9/1994 | Vezzani et al. ..................... 99/335 |
| 5,469,778 | 11/1995 | Prudhomme ....................... 99/336 |
| 5,586,486 | 12/1996 | Nitschke et al. ................. 99/407 X |

*Primary Examiner*—Reginald L. Alexander
*Attorney, Agent, or Firm*—Baker & Botts, L.L.P.

[57] ABSTRACT

An apparatus for automatically frying food products is disclosed. The apparatus includes a vat (102) containing cooking oil (108). Heating elements (104) heat the cooking oil to the desired temperature. Baskets (106) hold food products within the cooking oil (108). A dumping mechanism (150) automatically removes each basket (106) in turn from the cooking oil (108) and dumps the food products from the basket (106) into a dump pan (152).

15 Claims, 5 Drawing Sheets

METHOD AND APPARATUS FOR AUTOMATICALLY FRYING FOOD PRODUCTS

TECHNICAL FIELD OF THE INVENTION

This invention relates generally to the field of food preparation equipment and more specifically to a method and apparatus for automatically frying food products.

BACKGROUND OF THE INVENTION

The use of deep fryers for frying food products in restaurants is well-established. Deep fryers in common use typically comprise one or more baskets which are loaded with food products and placed by hand into a heated vat of oil. When the food products have cooked in the oil for the desired period of time, the basket or baskets are removed from the fryer by the person operating the fryer. The food products are then typically dumped into a tray, where excess oil is allowed to drain off the food products. Because this method relies on the participation of a human operator to remove the food products from the fryer, non-uniform frying times may result from preoccupation with other tasks or lack of diligence on the part of the operator.

With the growth of the fast food and ready-made food industries, demand has grown for high-volume food production equipment. For example, during a peak meal time, a fast food restaurant may be unable to keep up with the demand for french fries and other fried foods. Moreover, the work time consumed by such repetitive tasks as loading and unloading fryer baskets could be better spent on customer service, or could be eliminated altogether, resulting in lower food prices, higher demand, and greater profits for fried food producers.

Therefore, a need has arisen for a new method and system for frying food products that overcomes the disadvantages and deficiencies of the prior art. In particular, it is an object of the present invention to provide an apparatus for automatically frying food products which requires a minimal amount of human intervention or oversight. Another object of the invention is to provide an apparatus which is capable of automatically frying food products in large quantities, with high throughput. A further object of the invention is to provide an apparatus which is capable of automatically frying food products for a uniform, optimal period of time, thus providing the optimum taste and safety for the consumer.

SUMMARY OF THE INVENTION

An apparatus for automatically frying food products is disclosed. The apparatus comprises a vat containing a cooking medium. Heating elements heat the cooking medium to the desired temperature. A basket holds food products within the cooking medium. A dumping mechanism automatically removes the basket from the cooking medium and dumps the food products from the basket into a dump pan.

In another embodiment, a method for automatically frying food products comprises receiving food products in a basket in a vat; automatically coupling the basket to a dumping mechanism; automatically lifting the basket out of the vat; automatically removing the food products from the basket; and automatically returning the basket to the vat.

A technical advantage of the present invention is that a new apparatus for automatically frying food products is provided that requires a minimal amount of human intervention or oversight Another technical advantage of the present invention is that the apparatus is capable of automatically frying food products in large quantities, with high throughput. A further technical advantage of the present invention is that the apparatus is capable of automatically frying food products for a uniform, optimal period of time, thus providing the optimum taste and safety for the consumer.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE INVENTION

Figure 1A:
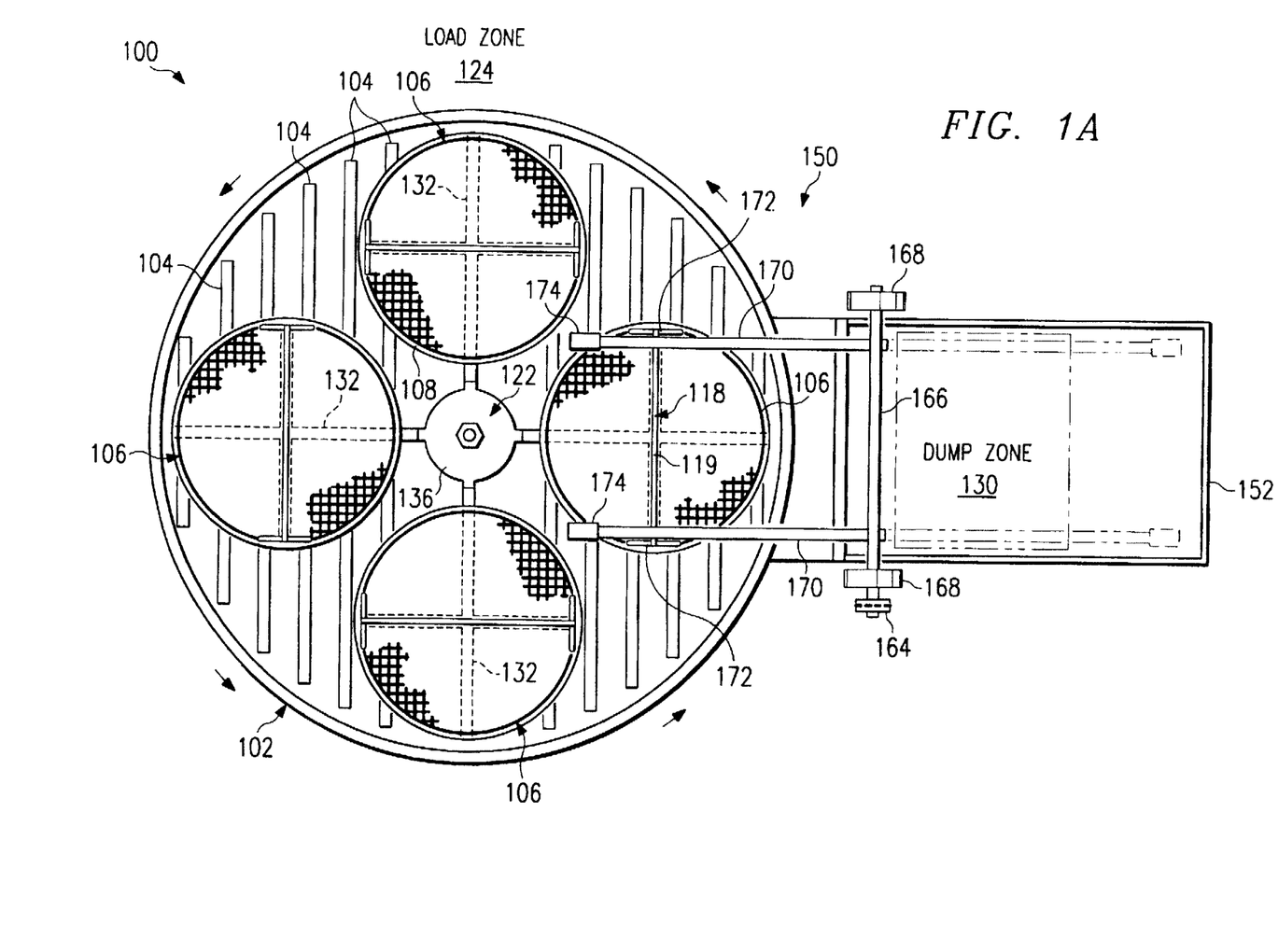
FIG. 1A is a top view of a first embodiment of an apparatus for automatically frying food products in accordance with the present invention.
Figure 1B:
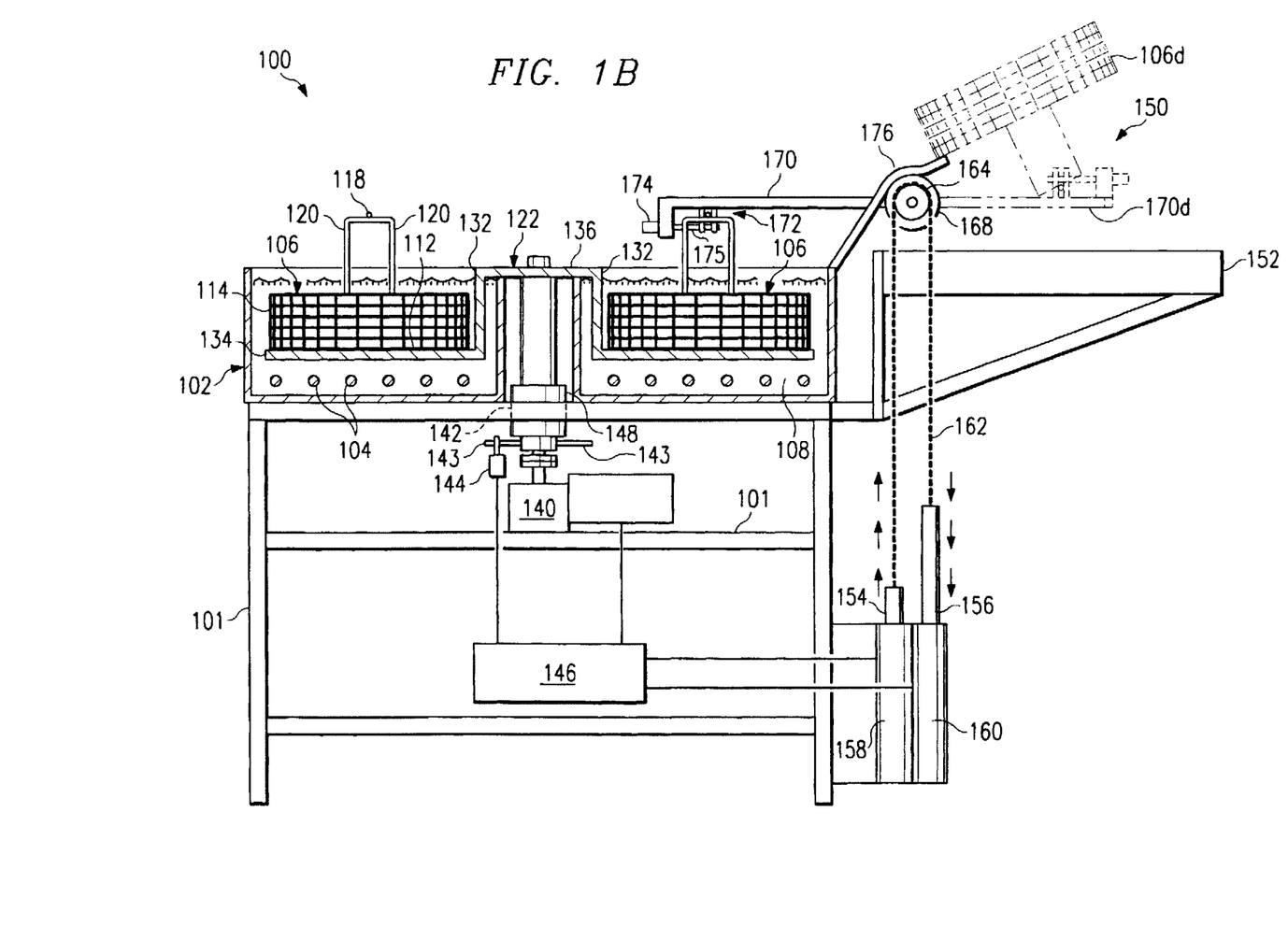
FIG. 1B is a side view of the first embodiment of the apparatus for automatically frying food products in accordance with the present invention.

Referring to FIGS. 1A and 1B, a multi-basket automatic deep fryer 100 is shown. The fryer 100 comprises a rigid frame 101 and an annular or ring-shaped vat 102 which is mounted on the frame 101 and which contains a cooking medium 108 such as cooking oil. The cooking medium 108 is heated by a plurality of heating elements 104 at the bottom of the vat 102. Heating elements 104 may be, for example, electric heating elements. Alternatively, gas burners may be used to heat the cooking medium 108.

A plurality of round food baskets 106 are immersed within the cooking medium 108. The baskets 106 are used to contain food products which are immersed in the cooking medium 108. The baskets 106 are also used to remove the food products from the vat 102 and dump them into a dump pan 152, in a manner to be described below.

Each basket 106 is comprised of a flat bottom 112, a cylindrical side wall 114, an open top and a handle 118. The basket side wall 114 and bottom 112 are made of metallic mesh or perforated metal so as to allow the cooking medium 108 to flow in and out of the basket 106 and to contain the food products within the basket 106 until the food products are to be dumped into dump pan 152. The basket handle 118 comprises a rod 119 that extends horizontally above the basket 106 across its diameter. The rod 119 is attached to the basket side wall 114 by vertical posts 120.

The baskets 106 are supported within the cooking medium 108 by a basket rack 122. Basket rack 122 comprises four L-shaped, cylindrical arms 132 attached to a central hub 136. Each arm 132 is fixedly attached to and supports a lipped tray 134 slightly larger than the bottom 112 of a basket 106. During normal operation of the fryer 100, one basket 106 sits on each tray 134 of basket rack 122. Basket rack 122 moves each basket 106 from one cooking zone 124 through 130 to another in a manner to be described below.

A motor 140 is used to rotate the basket rack 122 within the vat 102. The motor 140 is mounted on the frame 101 and is connected to the bottom end of a drive shaft 142 which is rotatably attached to the frame 101 by means of bearings 148. Drive shaft 142 passes through the hole in the annular vat 102 and connects at its top end to the hub 136 of the basket rack 122. Motor 140 is therefore operable to rotate drive shaft 142, thereby rotating the basket rack 122.

Four pins 143 are connected to drive shaft 142. Each pin 143 projects radially outward from drive shaft 142, and is separated by 90 degrees from the adjacent pins 143. When drive shaft 142 is rotated by motor 140, each pin in turn comes into contact with and displaces an actuating arm on a limit switch 144, thus closing an electrical connection therein. Limit switch 144 is fixed in position relative to the frame 101 and indeed may be attached thereto or mounted thereon. Limit switch 144 is used in conjunction with the timing and control of the operation of fryer 100, as will be described more fully below.

A dumping mechanism 150 is operable to automatically dump the contents of a basket 106 into the dump pan 152, when the basket is within a dump zone 130. The dumping mechanism 150 includes two air cylinders 158 and 160 mounted in a vertical position on the frame 101. Each air cylinder 158, 160 has a piston head (not shown) which may be forced to move longitudinally along the length of the cylinder. The direction in which the piston head moves, in this case either up or down, is determined by the position of a valve (not shown) which controls the direction of flow of compressed air into the air cylinder 158, 160, as is well known to those skilled in the art. Alternatively, air cylinders 158 and 160 could be replaced by linear actuators, the structure and operation of which is well known to those skilled in the art.

Each air cylinder 158 and 160 has a shaft 154 and 156, respectively, which is connected at one end to the piston head within its respective air cylinder 158 and 160. Each shaft 154 and 156 is connected at its other end to a terminus of a chain 162. The valves of air cylinders 158 and 160 are controlled by a timing and control mechanism 146, and are interlocked so that as one piston head is forced vertically upward by the compressed air flowing into its air cylinder, the other piston head is forced vertically downward, and vice versa.

The chain 162 drapes over a sprocket 164 and interlocks with teeth thereon. The opposing motions of the shafts 154 and 156 of air cylinders 158 and 160 cause the chain 162 to rotate the sprocket 164. Sprocket 164 is attached to a dump shaft 166, which is rotatably mounted on the frame 101 by means of bearings 168 attached to the frame 101. As the chain 162 turns the sprocket 164, the dump shaft 166 rotates about its axis.

Dumping mechanism 150 also includes two horizontal dump bars 170. Each dump bar 170 is attached at one end to the dump shaft 166. At its other end, each dump bar 170 is connected to a clamp 172 which is operable to grasp the handle 118 of a basket 106 within dump zone 130. Each clamp 172 includes an air cylinder 174 having a shaft 175.

Also included in the dumping mechanism 150 is a dump rail 176 which guides and tips a basket 106 during the dumping process in a manner to be described below. Dump rail 176 is mounted in a fixed position relative to the frame 101.

Timing and control mechanism 146 is operatively connected to motor 140, switch 144 and air cylinders 158, 160 and 174. Timing and control mechanism 144 is operable to determine whether limit switch 144 is open or closed, and therefore whether the actuating arm of limit switch 144 is being displaced by one of the pins 143 on drive shaft 142. Timing and control mechanism 144 is also operable to supply power to motor 140 and open and close the valves on air cylinders 158, 160 and 174 by means of solenoids, thus controlling and coordinating the rotation of basket rack 122, the rotation of dump shaft 166, and the clamping of clamps 172. As will be described more fully below, timing and control mechanism 146 coordinates these various movements based upon input from limit switch 144, and based upon an internal timer (not shown) which is operable to count down a preset time interval and generate a signal at the expiration of the time interval. Timing and control mechanism 146 may be turned on and off by a human operator by means of an on/off switch (not shown).

The operation of the fryer 100 will now be described. First, the vat 102 is filled with a cooking medium 108 such as cooking oil, and electric power is applied to the heating elements 104 to heat the cooking medium 108. Basket rack 122 should be rotated, if necessary, by a human operator to a correct position, in which one of the baskets 106 occupies loading zone 124, another basket 106 occupies dump zone 130, and one of the pins 143 on drive shaft 142 displaces the actuating arm on limit switch 144.

When the cooking medium 108 has reached the desired frying temperature, the human operator loads food products into the basket 106 which currently occupies the loading zone 124. The human operator then turns the on/off switch of timing and control mechanism 146 to the "on" position. This resets the internal timer in timing and control mechanism 146, which has been preset to count down a time interval, e.g. 60 seconds, that is approximately one quarter of the desired frying time for the food products to be fried.

When the timer expires at the end of the time interval, timing and control mechanism 146 supplies power to motor 140, causing basket rack 122 to rotate in a counterclockwise direction, as shown in FIG. 1A. As was previously noted, before basket rack 122 begins to rotate, one of the pins 143 on drive shaft 142 is in contact with and displaces the actuating arm on limit switch 144. When timing and control mechanism 146 supplies power to motor 140, the pin 143 displacing the actuating arm on limit switch 144 moves away from limit switch 144, thus allowing the actuating arm to resume its natural position. Timing and control mechanism 146 continues to supply power to motor 140 until another pin 143 comes into contact with and displaces the actuating arm on limit switch 144, thus indicating that basket rack 122 has been rotated 90 degrees.

At this time, timing and control mechanism 146 ceases to supply power to motor 140, thus stopping the rotation of basket rack 122 in such a position that one of the baskets 106 occupies loading zone 124 and another basket 106 occupies dump zone 130. Meanwhile, the basket 106 which was originally loaded with food products has been moved to a position opposite dump zone 130.

At approximately the same time that timing and control mechanism 146 cuts off the power to motor 140, the internal timer in timing and control mechanism 146 is reset and begins to count down the preset time interval. During this time interval, the human operator loads food products into the basket 106 which now occupies loading zone 124. When the time interval expires, timing and control mechanism 146 rotates basket rack 122 90 degrees once again, as previously described. This cycle repeats itself indefinitely, until the human operator turns the on/off switch on timing and control mechanism 146 to the "off" position.

During each of the previously-described cycles, as the internal timer in timing and control mechanism 146 is counting down the preset time interval, timing and control mechanism 146 causes dump mechanism 150 to execute a series of steps which results in the contents of the basket 106 which currently occupies dump zone 130 being dumped into dump pan 152. This series of steps, known as a dump cycle, will now be described.

The normal resting position for dump bars 170 is a horizontal position over dump tray 152, as illustrated in FIG. 1B by dump bar position 170d. Thus, as the first step of the dump cycle, timing and control mechanism 146 activates the valves on air cylinders 158 and 160, causing shaft 154 to move downward and shaft 156 to move upward. This causes dump shaft 166 to rotate in a counterclockwise direction, bringing dump bars 170 into the position illustrated with solid lines in FIG. 1B.

The rotation of basket rack 122 prior to the activation of dump mechanism 150 brings the handle 118 of the basket 106 in dump zone 130 into alignment with the clamps 172 on dump bars 170. Thus, as the next step in the dump cycle, timing and control mechanism 146 causes air cylinders 174 to extend their shafts 175 into position underneath the horizontal rod 119 of the basket handle 118. The rod 119 of basket handle 118 is therefore surrounded and held in place by the clamps 172. However, while the clamps 172 fix the position of the horizontal rod 119, they do not prevent the horizontal rod 119 from rotating about its longitudinal axis.

After air cylinders 174 have been activated to clamp the basket handle 118, timing and control mechanism 146 activates the valves on air cylinders 158 and 160, causing shaft 154 to move upward and shaft 156 to move downward. This causes dump shaft 166 to rotate in a clockwise direction as shown in FIG. 1B, which in turn causes the dump bars 170 to lift the basket 106 in dump zone 130 out of the cooking medium 108.

As the dump bars 170 pivot around dump shaft 166 toward a vertical position, the basket 106 is free to swing from rod 119 of basket handle 118, and as a result, the lower edge of the basket 106 comes into contact with, and is guided by, dump rail 176. As the dump bars 170 pivot past a vertical position and out over dump pan 152, as denoted in FIG. 1B by dump bar position 170d, dump rail 176 catches the lower edge of the basket 106 to bring the basket into an inverted position, as denoted in FIG. 1B by basket position 106d. In this position, any food products contained within the basket 106 fall out into dump pan 152.

In an alternative embodiment, dump rail 176 comprises a flat, rectangular plate fixedly attached along an upper edge to dump shaft 166, and having a width approximately equal to the width of a basket 106. In this embodiment, dump rail 176 depends downwardly from dump shaft 166 when dump arms 170 are in a position to grasp and release a basket 106. Dump rail 176 is rotatable with respect to the frame 101 by virtue of its attachment to the dump shaft.

The rectangular plate is mounted in such a position that, as a basket 106 is lifted from the vat 102 by dump arms 170, the lower edge of the plate comes into contact with the side of the basket 106, causing the basket 106 to rotate as dump shaft 176 continues to rotate. This eventually brings the basket 106 into a dumping position substantially similar to position 106d illustrated in FIG. 1B. An advantage of this alternative embodiment is that dump rail 176 may be mounted on dump shaft 176 in such a position that, when the basket 106 reaches a dumping position similar to position 106d, dump rail 176 provides a ramp at a slope of approximately 30 to 45 degrees from vertical, down which food products may slide from the basket 106 to dump pan 152.

It will be recognized by those skilled in the art that either of the above-described embodiments of dump rail 176 is compatible with the structure and sequence of operation of fryer 100 described herein.

As the next step in the dump cycle, timing and control mechanism 146 reverses the direction of air flow in air cylinders 158 and 160, thus causing shaft 154 to move downward and shaft 156 to move upward, which in turn causes dump shaft 166 to rotate in a counterclockwise direction as shown in FIG. 1B. This forces the basket 106 to return to its initial position, supported by basket rack 122 and immersed in the cooking medium 108. Timing and control mechanism 146 then causes air cylinders 174 to retract their shafts 175, thus releasing the basket handle 118 from the clamps 172.

Finally, as the last step in the dump cycle, timing and control mechanism 146 activates the valves on air cylinders 158 and 160, causing shaft 154 to move upward and shaft 156 to move downward. This causes dump shaft 166 to rotate in a clockwise direction, which in turn causes the dump bars 170 to return to their original resting position at dump bar position 170d.

Those skilled in the art will appreciate that, to ensure the proper operation of fryer 100, the preset time interval executed by the internal timer of timing and control mechanism 146 must be of sufficient duration to allow the completion of the dump cycle which has just been described.

Figure 2A:
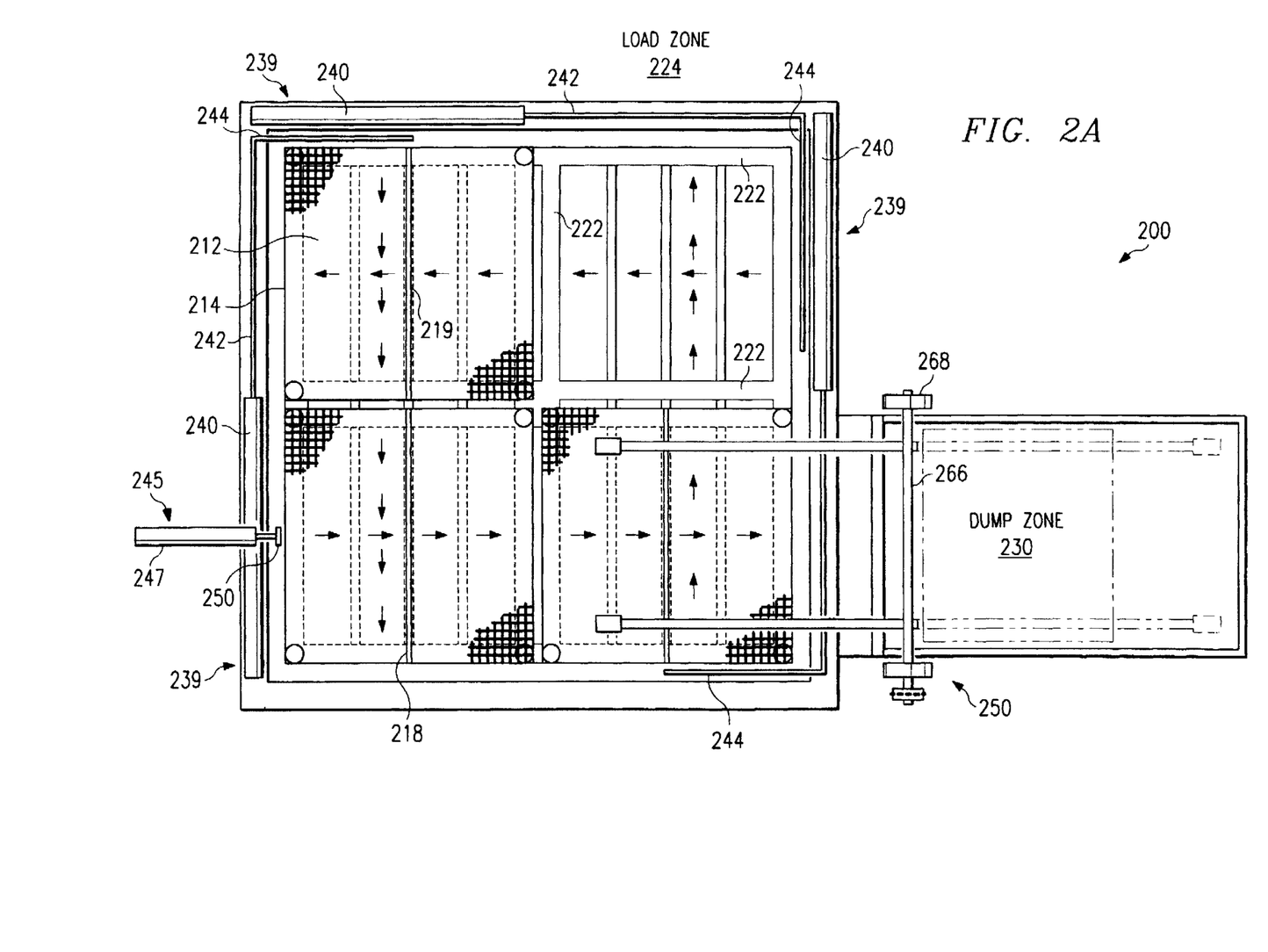
FIG. 2A is a top view of a second embodiment of the apparatus for automatically frying food products in accordance with the present invention.
Figure 2B:
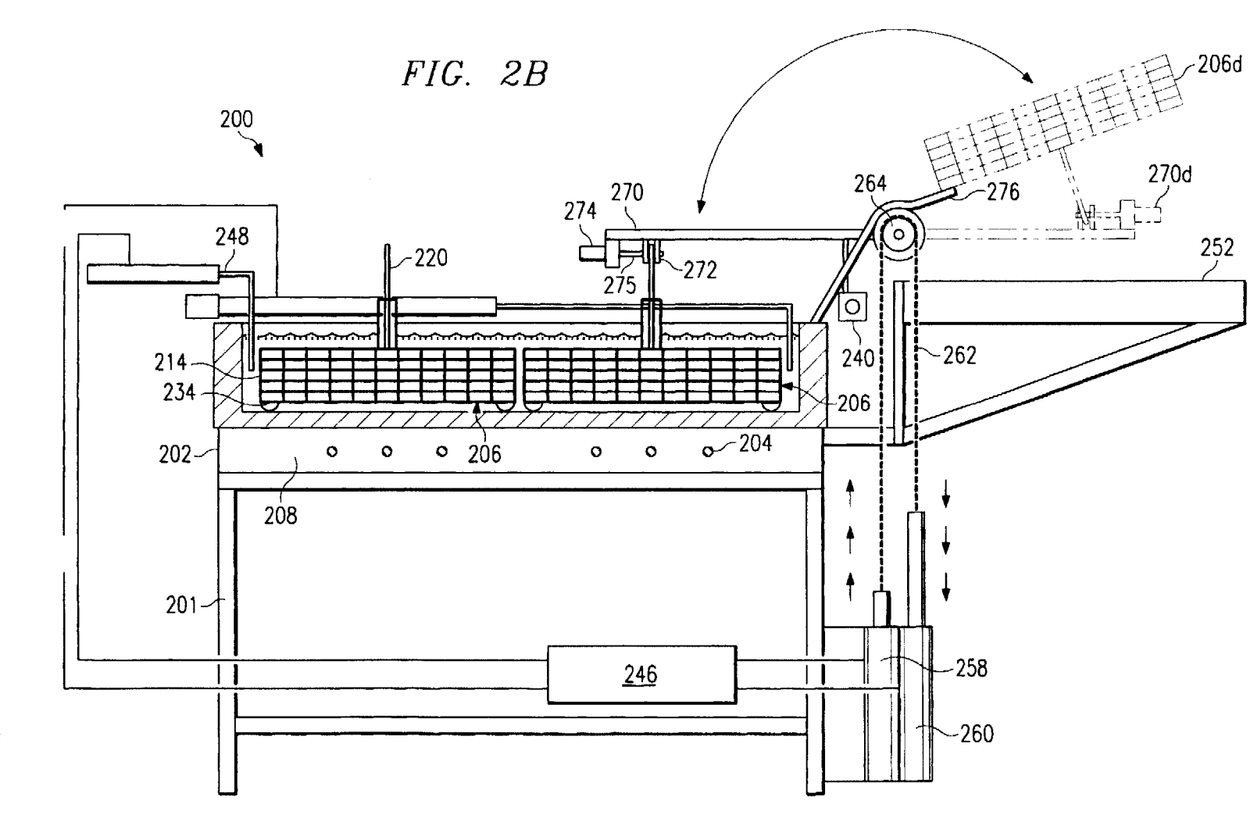
FIG. 2B is a side view of the second embodiment of the apparatus for automatically frying food products in accordance with the present invention.

Referring to FIGS. 2A and 2B, another embodiment 200 of the multi-basket automatic fryer is shown. This embodiment is similar to the one previously described, in that a plurality of baskets 206 are moved through four positions in a fryer 200. In one of the positions, the contents of each basket are dumped by a dumping mechanism 250 into a dump pan 252. However, in this embodiment, the means by which the baskets 206 are moved within the fryer 200 is different from that of the previously described embodiment.

Fryer 200 comprises a rigid frame 201 and a square vat 202 which is mounted on the frame 201, and which contains a cooking medium 208 such as cooking oil. The cooking medium 208 is heated by a plurality of heating elements 204 at the bottom of the vat 202. Heating elements 204 may be, for example, electric heating elements. Alternatively, gas burners may be used to heat the cooking medium 208.

Three square food baskets 206 are immersed within the cooking medium 208, occupying three of the corners or quadrants of the vat 202. The baskets 206 are used to contain food products which are immersed in the cooking medium 208. The baskets 206 are also used to remove the food products from the vat 202 and dump them into a dump pan 252, in a manner to be described below.

Each basket 206 is comprised of a square, flat bottom 212, four sides 214, an open top, a handle 218 and roller balls 234. The basket sides 214 and bottom 212 are made of metallic mesh or perforated metal so as to allow the cooking medium 208 to flow in and out of the basket 206 and to contain the food products within the basket 206 until the food products are to be dumped into dump pan 252. The basket handle 218 comprises a rod 219 that extends horizontally above the basket 206 across its center. The rod 219 is attached to the basket sides 214 by vertical posts 220.

A roller ball 234 is attached to the bottom 212 of each basket 206 near each corner of the basket. Each roller ball 234 is capable of rolling in any horizontal direction. Alternatively, each roller ball 234 may be replaced by a swiveling wheel which is rotatably attached to the bottom 212 of the basket 206 and is capable of aligning itself to roll in any horizontal direction. Those skilled in the art will recognize that other, similar rolling mechanisms may be used in place of roller balls 234 to allow basket 206 to roll horizontally.

The baskets 206 are supported within the cooking medium 208 by a set of flat rails 222. The placement of the rails 222 is such that the roller balls 234 on the baskets 206 roll along the rails 222 as each basket 206 is moved horizontally from one corner or quadrant of the fryer 200 to another. Each rail 222 has lips (not shown) along its edges which prevent a roller ball 234 from falling off the rail.

The baskets 206 are moved within fryer 200 by three basket push devices 239 of a first type or arrangement, and one basket push device 245 of a second type or arrangement. Each first-type basket push device 239 comprises an air cylinder 240, a shaft 242 which may be extended from and retracted into the air cylinder 240, and a push bar 244 attached to one end of the shaft 242. Each air cylinder 240 is operable to retract its shaft 242, thus pulling its push bar 244 across one quadrant of the vat 202. If this operation is performed when the quadrant across which push bar 244 is moving is occupied by a basket 206, and the quadrant toward which the push bar 244 is moving is not occupied by a basket 206, then the basket occupying the former quadrant will roll along the rails 222 from the former quadrant to the latter as it is pushed by push bar 244. After a basket 206 has been pushed to a new quadrant, the air cylinder 240 is operable to extend its shaft 242, thus returning its push bar 244 to its original position as depicted in FIG. 2A. The second-type basket push device 245 comprises an air cylinder 247, a shaft 248 and a push bar 250. Air cylinder 247 is operable to extend shaft 248, thus moving push bar 250 across the lower left quadrant of the vat 202 as depicted in FIG. 2A. If this operation is performed while the lower left quadrant is occupied by a basket 206 and while the lower right quadrant is not occupied by a basket 206, then the basket occupying the lower left quadrant will roll along the rails 222 from the lower left quadrant to the lower right quadrant as it is pushed by push bar 250. After a basket 206 has been pushed to a new quadrant, air cylinder 247 is operable to retract shaft 248, thus returning push bar 250 to its original position as depicted in FIG. 2A.

A dumping mechanism 250 is operable to automatically dump the contents of a basket 206 into the dump pan 252, when the basket is within a dump zone 230, which in the illustrated embodiment comprises the lower right quadrant of the vat 202. The dumping mechanism 250 includes two air cylinders 258 and 260 mounted in a vertical position on the frame 201. Each air cylinder 258 and 260 has a shaft 254 and 256, respectively, which is connected at one end to the piston head within its respective air cylinder 258 and 260. Each shaft 254 and 256 is connected at its other end to a terminus of a chain 262. The valves of air cylinders 258 and 260 are controlled by a timing and control mechanism 246, and are interlocked so that as one piston head is forced vertically upward by the compressed air flowing into its air cylinder, the other piston head is forced vertically downward, and vice versa. Alternatively, air cylinders 258 and 260 could be replaced by linear actuators, the structure and operation of which is well known to those skilled in the art.

The chain 262 drapes over a sprocket 264 and interlocks with teeth thereon. The opposing motions of the shafts 254 and 256 of air cylinders 258 and 260 cause the chain 262 to rotate the sprocket 264. Sprocket 264 is attached to a dump shaft 266, which is rotatably mounted on the frame 201 by means of bearings 268 attached to the frame 201. As the chain 262 turns the sprocket 264, the dump shaft 266 rotates about its axis.

Dumping mechanism 250 also includes two horizontal dump bars 270. Each dump bar 270 is attached at one end to the dump shaft 266. At its other end, each dump bar 270 is connected to a clamp 272 which is operable to grasp the handle 218 of a basket 206 within dump zone 230. Each clamp 272 includes an air cylinder 274 having a shaft 275. Also included in the dumping mechanism 250 is a dump rail 276 which guides and tips a basket 206 during the dumping process in a manner to be described below. In an alternative embodiment, dump rail 276 comprises a flat, rectangular plate connected to dump shaft 266 in the manner described above with respect to the alternative embodiment of dump rail 176.

Timing and control mechanism 246 is operatively connected to air cylinders 240, 247, 258, 260 and 274. Timing and control mechanism 246 is operable to open and close the valves on air cylinders 240, 247, 258, 260 and 274 by means of solenoids, thus controlling and coordinating the movement of the baskets 206, the rotation of dump shaft 266, and the clamping of clamps 272. As will be described more fully below, timing and control mechanism 246 coordinates these various movements based upon an internal timer (not shown) which, when reset, is operable to count down a preset time interval and generate a signal at the expiration of the time interval indicating that the time interval has expired. Timing and control mechanism 246 may be turned on and off by a human operator by means of an on/off switch (not shown).

The operation of the fryer 200 will now be described. First, the vat 202 is filled with a cooking medium 208 such as cooking oil, and electric power is applied to the heating elements 204 to heat the cooking medium 208. Baskets 206 should be moved by a human operator to an initial position, in which one particular quadrant of the vat 202 is left unoccupied, if such a position will be assumed to exist by timing and control mechanism 246 upon startup. For example, to ensure proper coordination of the movements within fryer 206, it may be necessary to initially arrange the baskets 206 so that the upper left quadrant of the vat 202 as depicted in FIG. 2A is unoccupied, while the remaining quadrants of the vat 202 are occupied by the three baskets 206. For purposes of this description, it will be assumed that the baskets 206 have been initially arranged in this position.

When the cooking medium 208 has reached the desired frying temperature, the human operator loads food products into the basket 206 which currently occupies the loading zone 224. The human operator then turns the on/off switch of timing and control mechanism 246 to the "on" position. This resets the internal timer in timing and control mechanism 246, which has been preset to count down a time interval, e.g. 60 seconds, that is approximately one quarter of the desired frying time for the food products to be fried.

When the timer expires at the end of the time interval, timing and control mechanism 246 causes the air cylinder 240 adjacent to the upper left quadrant of the vat 202 to retract its shaft 242, thus causing its push bar 244 to push the basket 206 in the loading zone 224 to the unoccupied upper left quadrant. Then timing and control mechanism 246 causes the air cylinder 240 adjacent to the upper right quadrant to retract its shaft 242, thus causing its push bar 244 to push the basket 206 in the dump zone 230 to the recently vacated loading zone 224. Then timing and control mechanism 246 causes air cylinder 247 to extend shaft 248, thus causing push bar 250 to push the basket 206 in the lower left quadrant to the recently vacated dump zone 230.

At this point, each basket 206 has been moved to a new quadrant. The internal timer in timing and control mechanism 246 is then reset and begins to count down the preset time interval. During this time interval, the human operator loads food products into the basket 206 which occupies loading zone 224.

When the time interval expires, timing and control mechanism 246 once again causes each basket 206 to be moved to a new quadrant within the vat 202, as previously described. Clearly, the sequence of movements needed to move all three baskets 206 to new quadrants a second time requires timing and control mechanism 246 to activate air cylinders 240 and 247 in a different order from that described for moving the baskets 206 the first time. Those skilled in the art will appreciate that timing and control mechanism 246 may be designed or programmed to execute the proper series of movements each time the baskets 206 must be moved.

The above-described cycle, comprising a series of basket movements followed by a timer countdown, repeats itself indefinitely, until the human operator turns the on/off switch on timing and control mechanism 246 to the "off" position.

During each of the previously-described cycles, as the internal timer in timing and control mechanism 246 is counting down the preset time interval, timing and control mechanism 246 causes dump mechanism 250 to execute a series of steps which results in the contents of the basket 206 which currently occupies dump zone 230 being dumped into dump pan 252. This series of steps, known as a dump cycle, will now be described.

The normal resting position for dump bars 270 is a horizontal position over dump tray 252, as illustrated in FIG. 2B by dump bar position 270d. Thus, as the first step of the dump cycle, timing and control mechanism 246 activates the valves on air cylinders 258 and 260, causing shaft 254 to move downward and shaft 256 to move upward. This causes dump shaft 266 to rotate in a counterclockwise direction, bringing dump bars 270 into the position illustrated with solid lines in FIG. 2B.

The movement of a basket 206 into dump zone 230 prior to the activation of dump mechanism 250 brings the handle 218 of the basket 206 into alignment with the clamps 272 on dump bars 270. Thus, as the next step of the dump cycle, timing and control mechanism 246 causes air cylinders 274 to extend their shafts 275 into position underneath the horizontal rod 219 of the basket handle 218. The rod 219 of basket handle 218 is therefore surrounded and held in place by the clamps 272. However, while the clamps 272 fix the position of the horizontal rod 219, they do not prevent the horizontal rod 219 from rotating about its longitudinal axis.

After air cylinders 274 have been activated to clamp the basket handle 218, timing and control mechanism 246 activates the valves on air cylinders 258 and 260, causing shaft 254 to move upward and shaft 256 to move downward. This causes dump shaft 266 to rotate in a clockwise direction as shown in FIG. 2B, which in turn causes the dump bars 270 to lift the basket 206 in dump zone 230 out of the cooking medium 208.

As the dump bars 270 pivot around dump shaft 266 toward a vertical position, the basket 206 is free to swing from rod 219 of basket handle 218, and as a result, the lower edge of the basket 206 comes into contact with and is guided by dump rail 276. As the dump bars 270 pivot past a vertical position and out over dump pan 252, as denoted in FIG. 2B by dump bar position 270d, dump rail 276 catches the lower edge of the basket 206 to bring the basket into an inverted position, as denoted in FIG. 2B by basket position 206d. In this position, any food products contained within the basket 206 fall out into dump pan 252.

Timing and control mechanism 246 then reverses the direction of air flow in air cylinders 258 and 260, thus causing shaft 254 to move downward and shaft 256 to move upward, which in turn causes dump shaft 266 to rotate in a counterclockwise direction as shown in FIG. 2B. This forces the basket 206 to return to its initial position, supported by rails 222 and immersed in the cooking medium 208. Timing and control mechanism 246 then causes air cylinders 274 to retract their shafts 275, thus releasing the basket handle 218 from the clamps 272.

Finally, as the last step in the dump cycle, timing and control mechanism 246 activates the valves on air cylinders 258 and 260, causing shaft 254 to move upward and shaft 256 to move downward. This causes dump shaft 266 to rotate in a clockwise direction, which in turn causes the dump bars 270 to return to their original resting position at dump bar position 270d.

Those skilled in the art will appreciate that, to ensure the proper operation of fryer 200, the preset time interval executed by the internal timer of timing and control mechanism 246 must be of sufficient duration to allow the completion of the dump cycle which has just been described.

Figure 3:
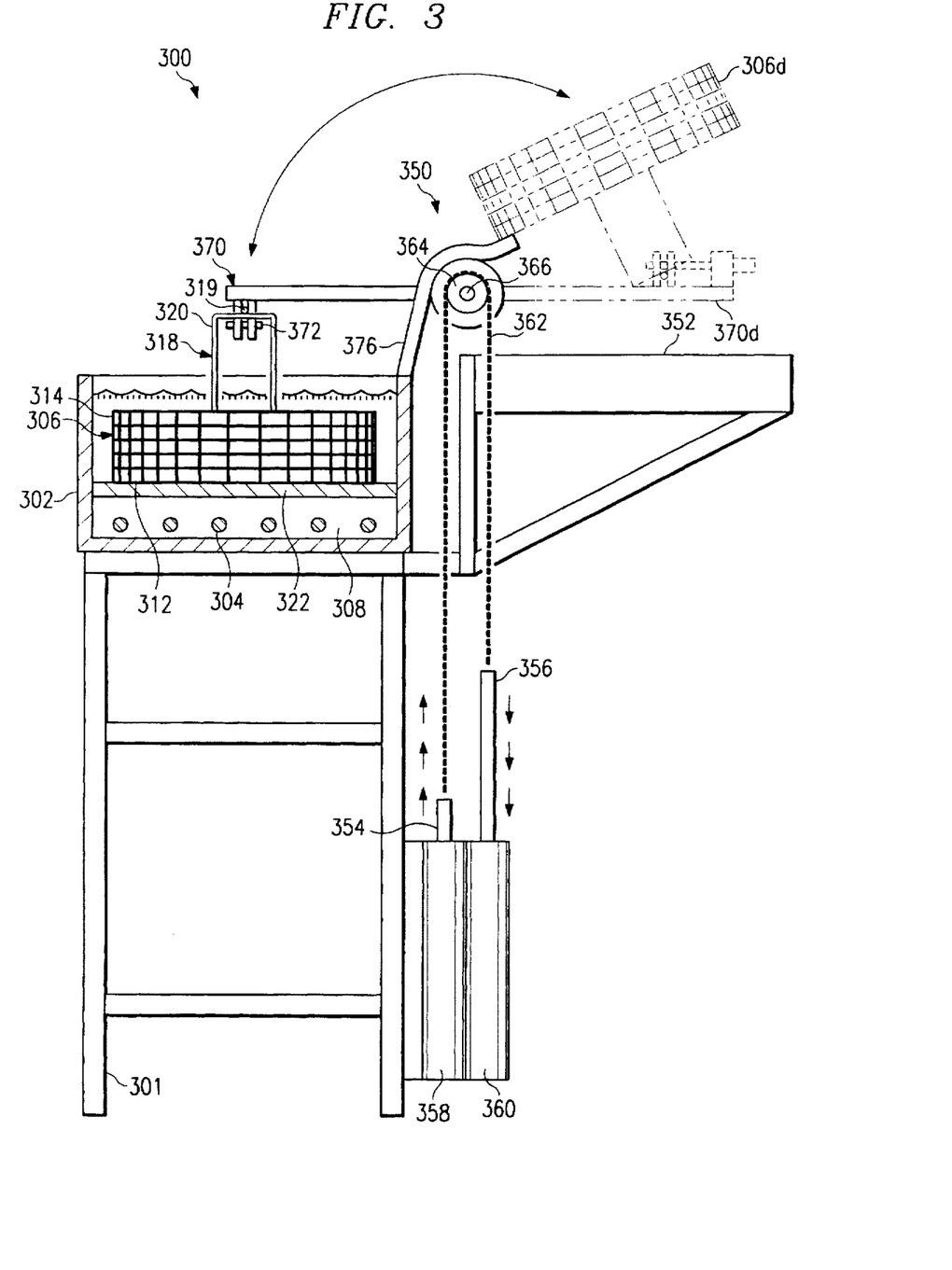
FIG. 3 is a side view of a third embodiment of the apparatus for automatically frying food products in accordance with the present invention.

Referring to FIG. 3, a single-basket automatic fryer 300 is shown. Fryer 300 comprises a rigid frame 301 and a vat 302 which is mounted on the frame 301 and which contains a cooking medium 308 such as cooking oil. The cooking medium 308 is heated by a plurality of heating elements 304 at the bottom of the vat 302. Heating elements 304 may be, for example, electric heating elements. Alternatively, gas burners may be used to heat the cooking medium 308.

A food basket 306 is immersed within the cooking medium 308. The basket 306 is used to contain food products which are immersed in the cooking medium 308. The basket 306 is also used to remove the food products from the vat 302 and dump them into a dump pan 352, in a manner to be described below.

The basket 306 is comprised of a flat bottom 312, a cylindrical side wall 314, an open top and a handle 318. The basket side wall 314 and bottom 312 are made of metallic mesh or perforated metal so as to allow the cooking medium 308 to flow in and out of the basket 306 and to contain the food products within the basket 306 until the food products are to be dumped into dump pan 352. The basket handle 318 comprises a rod 319 that extends horizontally above the basket 306 across its center. The rod 319 is attached to the basket side wall 314 by vertical posts 320. The basket 306 is supported within the cooking medium 308 above the heating elements 304 by a basket rack 322.

A dumping mechanism 350 is operable to automatically dump the contents of a basket 306 into the dump pan 352. The dumping mechanism 350 includes two air cylinders 358 and 360 mounted in a vertical position on the frame 301. Each air cylinder 358 and 360 has a shaft 354 and 356, respectively, which is connected at one end to the piston head within its respective air cylinder 358 and 360. Each shaft 354 and 356 is connected at its other end to a terminus of a chain 362. The valves of air cylinders 358 and 360 are controlled by a timing and control mechanism (not shown), and are interlocked so that as one piston head is forced vertically upward by the compressed air flowing into its air cylinder, the other piston head is forced vertically downward, and vice versa. Alternatively, air cylinders 358 and 360 could be replaced by linear actuators, the structure and operation of which is well known to those skilled in the art.

The chain 362 drapes over a sprocket 364 and interlocks with teeth thereon. The opposing motions of the piston heads and shafts 354 and 356 of air cylinders 358 and 360 cause the chain 362 to rotate the sprocket 364. Sprocket 364 is attached to a dump shaft 366, which is rotatably mounted on the frame 301 by means of bearings (not shown) attached to the frame 301. As the chain 362 turns the sprocket 364, the dump shaft 366 rotates about its axis.

Dumping mechanism 350 also includes two horizontal dump bars 370. Each dump bar 370 is attached at one end to the dump shaft 366. At its other end, each dump bar 370 is connected to a clamp 372 which grasps the handle 318 of the basket 306. Also included in the dumping mechanism 350 is a dump rail 376 which guides and tips a basket 306 during the dumping process in a manner to be described below. In an alternative embodiment, dump rail 376 comprises a flat, rectangular plate connected to dump shaft 266 in the manner described above with respect to the alternative embodiment of dump rail 176.

A timing and control mechanism (not shown) is operatively connected to air cylinders 358 and 360, and is operable to open and close the valves on air cylinders 358 and 360 by means of solenoids, thus controlling the rotation of dump shaft 366. The timing and control mechanism coordinates this movement based upon an internal timer which is operable to count down a preset time interval and generate a signal at the expiration of the time interval indicating that the time interval has expired. The timing and control mechanism may be started by a human operator by means of a start switch.

The operation of the fryer 300 will now be described. First, the vat 302 is filled with a cooking medium 308 such as cooking oil, and electric power is applied to the heating elements 304 to heat the cooking medium 308. When the cooking medium 308 has reached the desired frying temperature, the human operator loads food products into the basket 306. The human operator then pushes the start switch of the timing and control mechanism. This resets the internal timer in the timing and control mechanism, which has been preset to count down a time interval, e.g. five minutes, that approximates the desired frying time for the food products to be fried.

When the timer expires at the end of the time interval, the timing and control mechanism causes dump mechanism 350 to execute a series of steps which results in the contents of the basket 306 which currently occupies dump zone 330 being dumped into dump pan 352. This series of steps is known as a dump cycle.

First, the timing and control mechanism activates the valves on air cylinders 358 and 360, causing shaft 354 to move upward and shaft 356 to move downward. This causes dump shaft 366 to rotate in a clockwise direction, which in turn causes the dump bars 370 to lift the basket 306 out of the cooking medium 308.

As the dump bars 370 pivot around dump shaft 366 toward a vertical position, the basket 306 is free to swing from rod 319 of basket handle 318, and as a result, the lower edge of the basket 306 comes into contact with and is guided by dump rail 376. As the dump bars 370 pivot past a vertical position and out over dump pan 352, as denoted by dump bar position 370d, dump rail 376 catches the lower edge of the basket 306 to bring the basket into an inverted position, as denoted by basket position 306d. In this position, any food products contained within the basket 306 fall out into dump pan 352.

The timing and control mechanism then reverses the direction of air flow in air cylinders 358 and 360, thus causing shaft 354 to move downward and shaft 356 to move upward, which in turn causes dump shaft 366 to rotate in a counterclockwise direction. This forces the basket 306 to return to its initial position, supported by basket rack 322 and immersed in the cooking medium 308. This is the end of the dump cycle.

When the dump cycle has been completed, the human operator may load food products into basket 306 and push the start switch on the timing and control mechanism to begin the frying cycle once again. Alternatively, the timing and control mechanism may be designed so that, at the end of the above-described dump cycle, the internal timer in the timing and control mechanism is reset and begins to count down the preset time interval. During this time interval, and preferably at the beginning of the time interval, the human operator loads food products into the basket 306. This cycle may repeat itself indefinitely, until the human operator pushes an "off" switch on the timing and control mechanism.

In each of the automatic fryer embodiments described above, one of the air cylinders or linear actuators controlling the rotation of the dump shaft, such as air cylinders 358 and 360 shown in FIG. 3, could alternatively be a spring or other device capable of exerting a restorative or retractile force. The dumping cycle would then be controlled by the action of the remaining air cylinder or linear actuator. Specifically, the remaining air cylinder or linear actuator must be capable of retracting its shaft, thereby pulling on one terminus the chain and extending the spring or other device attached to the other terminus of the chain. When the air cylinder or linear actuator ceases to exert retracting force on its shaft, then the restorative force of the spring acts to pull on the chain and extend the shaft of the air cylinder or linear actuator. This action would therefore mimic the action of the above-described dumping mechanisms having two air cylinders or linear actuators.

While the invention has been particularly shown and described by the foregoing detailed description, it will be understood by those skilled in the art that various other changes in form and detail may be made without departing from the spirit and scope of the invention which is solely defined by the appended claims.

What is claimed is:

1. An apparatus for automatically frying food products, comprising:

a vat operable to contain a cooking medium;

a heater operable to heat the cooking medium;

a plurality of baskets operable to hold food products within the cooking medium and lift the food products out of the vat, each basket having a handle;

a dumping mechanism comprising a dump bar having first and second ends, the first end having a grasping mechanism operable to grasp the handle of a selected one of the baskets, the second end being connected to a pivot, the dumping mechanism being operable to automatically remove the selected one of the baskets from the cooking medium.

2. The apparatus of claim 1, further comprising a drive system operable to move the baskets within the vat.

3. The apparatus of claim 2, wherein the drive system comprises:

a basket rack operable to support the baskets within the vat, the basket rack being rotatable with respect to the vat; and a motor operable to rotate the basket rack with respect to the vat.

4. The apparatus of claim 2 wherein the drive system comprises:

a plurality of rails operable to support the baskets within the vat; and a pushing mechanism operable to horizontally displace the baskets within the vat; and wherein each basket comprises a plurality of rollers operable to roll along the rails.

5. An apparatus for automatically frying food products, comprising:

a vat operable to contain a cooking medium;

a heater operable to heat the cooking medium;

a basket operable to hold a food product within the cooking medium and lift the food product out of the vat, the basket having a side and a handle attached to and extending above the side;

a dumping mechanism comprising a dump bar having first and second ends, the first end being removably coupled to the handle of the basket and the second end being connected to a pivot, the dumping mechanism being operable to automatically remove the basket from the cooking medium and automatically remove the food product from the basket; and a drive system operable to move the basket within the vat.

6. The apparatus of claim 5, wherein the drive system comprises:

a basket rack operable to support the basket within the vat, the basket rack being rotatable with respect to the vat; and a motor operable to rotate the basket rack with respect to the vat.

7. The apparatus of claim 5, wherein the drive system comprises:

a plurality of rails operable to support the basket within the vat; and a pushing mechanism operable to horizontally displace the basket within the vat; and wherein the basket comprises a plurality of rollers operable to roll along the rails.

8. An apparatus for automatically frying food products, comprising:

a vat operable to contain a cooking medium;

a heater operable to heat the cooking medium;

a basket operable to hold a food product within the cooking medium and lift the food product out of the vat;

a dumping mechanism comprising a dump bar having first and second ends, the first end being removably coupled to the basket and the second end being connected to a pivot, the dumping mechanism being operable to automatically remove the basket from the cooking medium and automatically remove the food product from the basket; and a drive system operable to move the basket within the vat, the drive system having a basket rack operable to support the basket within the vat, the basket rack being rotatable with respect to the vat, the drive system further having a motor operable to rotate the basket rack with respect to the vat.

9. An apparatus for automatically frying food products, comprising:

a vat operable to contain a cooking medium;

a heater operable to heat the cooking medium;

a basket operable to hold a food product within the cooking medium and lift the food product out of the vat;

a dumping mechanism comprising a dump bar having first and second ends, the first end being removably coupled to the basket and the second end being connected to a pivot, the dumping mechanism being operable to automatically remove the basket from the cooking medium and automatically remove the food product from the basket; and a drive system operable to move the basket within the vat, the drive system having a plurality of rails operable to support the basket within the vat, the drive system further having a pushing mechanism operable to horizontally displace the basket within the vat, wherein the basket comprises a plurality of roller balls operable to roll along the rails.

10. An apparatus for automatically frying food products, comprising:

a vat operable to contain a cooking medium;

a heater operable to heat the cooking medium;

a basket operable to hold a food product within the cooking medium and lift the food product out of the vat, the basket having a side and a handle attached to and extending above the side; and a dumping mechanism comprising a dump bar having first and second ends, the first end being removably coupled to the handle of the basket and the second end being connected to a pivot, the dumping mechanism being operable to automatically remove the basket from the cooking medium and automatically remove the food product from the basket;

wherein the dumping mechanism further comprises a clamp attached to the first end of the dump bar, the clamp being operable to automatically and releasably clamp the handle of the basket.

11. An apparatus for automatically frying food products, comprising:

a vat operable to contain a cooking medium;

a heater operable to heat the cooking medium;

a basket operable to hold a food product within the cooking medium and lift the food product out of the vat, the basket having a side and a handle attached to and extending above the side; and a dumping mechanism comprising a dump bar having first and second ends, the first end being removably coupled to the handle of the basket and the second end being connected to a pivot, the dumping mechanism being operable to automatically remove the basket from the cooking medium and automatically remove the food product from the basket;

wherein the handle of the basket comprises a side piece attached to and extending above the side of the basket and a cross piece attached to the side piece and extending over the basket.

12. A method for automatically cooking food products, comprising the steps of:

receiving a food product into a basket;

placing the basket into a vat having a cooking medium;

heating the cooking medium so as to cook the food product;

automatically coupling the basket to a dumping mechanism;

automatically lifting the basket out of the vat;

automatically removing the food product from the basket;

automatically returning the basket to the vat; and displacing the basket horizontally within the vat.

13. The method of claim 12, further comprising the step of automatically decoupling the basket from the dumping mechanism.

14. The method of claim 12, further comprising the steps of:

automatically lifting a second basket out of the vat; and automatically returning the second basket to the vat.

15. The method of claim 14, further comprising the steps of:

automatically coupling the second basket to the dumping mechanism; and automatically decoupling the second basket from the dumping mechanism.

* * * * *